United States Patent

Mullen

[15] 3,694,021

[45] Sept. 26, 1972

[54] MECHANICAL HAND

[72] Inventor: James F. Mullen, First Nat'l Bank Bldg., 22 W. First St., Mt. Vernon, N.Y. 10801

[22] Filed: July 31, 1970

[21] Appl. No.: 60,030

[52] U.S. Cl. ..........................294/106, 3/1.2, 3/12.7, 214/1 CM
[51] Int. Cl. ................................................A61f 1/06
[58] Field of Search ...............3/1.2, 12.7; 214/1 CM; 294/106

[56] References Cited

FOREIGN PATENTS OR APPLICATIONS 982,217   2/1965   Great Britain.................3/12.7

*Primary Examiner*—Gerald M. Forlenza
*Assistant Examiner*—George F. Abraham
*Attorney*—Arthur T. Fattibene

[57] ABSTRACT

This disclosure is directed to a mechanical hand constructed to simulate the articulated movements of a human hand. The mechanical hand comprises a base member simulating the palm portion of a human hand with a plurality of finger digits and a thumb digit articulated to the base portion. Each finger and thumb digit includes pivotally connected segments or joints to simulate or duplicate the finger and thumb movements of a human hand. Tendons are operatively connected to each of the respective digits to effect the flexing thereof, and an actuator is operatively associated with each of the respective tendons to effect either independent and/or simultaneous actuation of the respective digits for movement between operative and inoperative positions.

22 Claims, 5 Drawing Figures

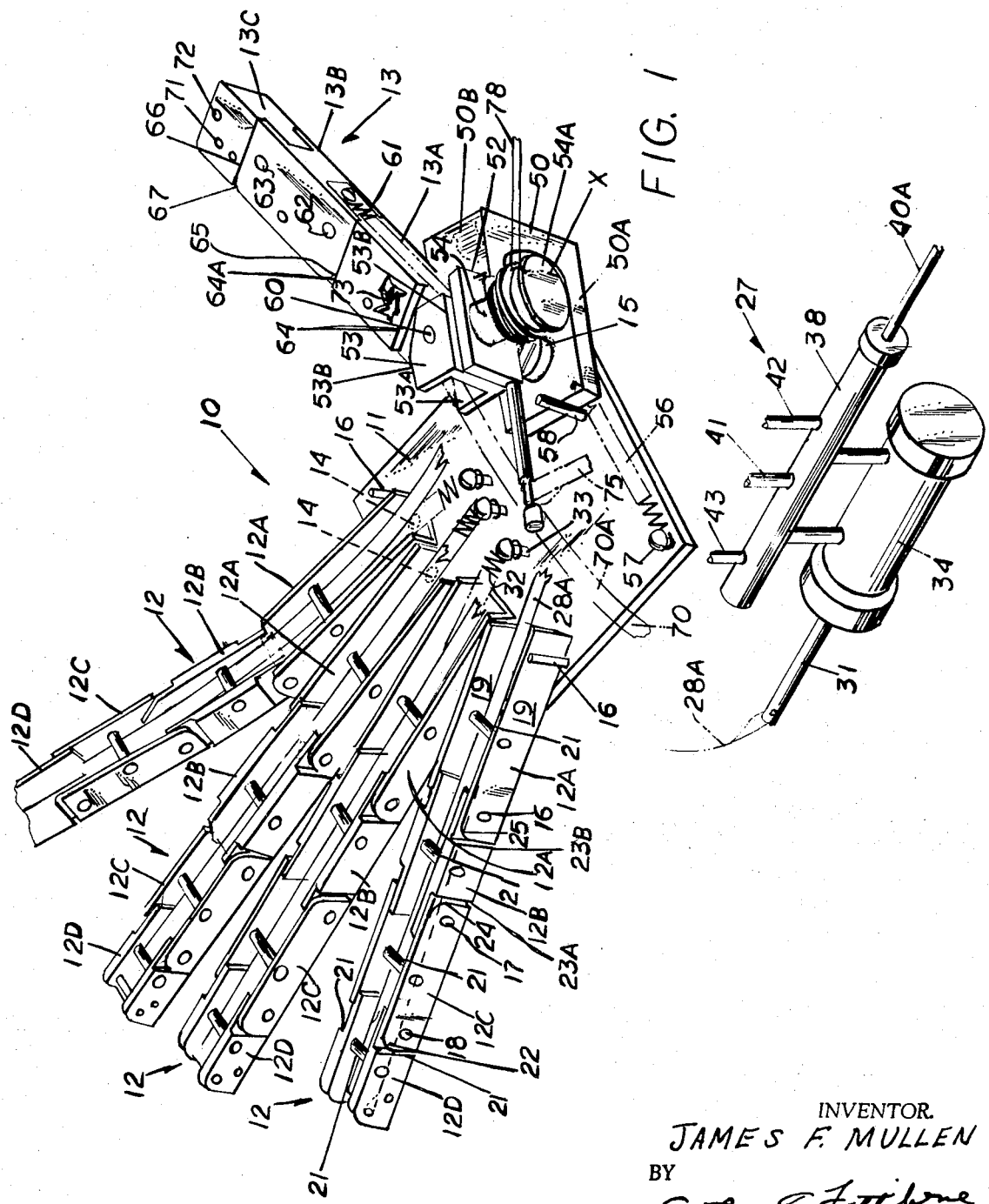

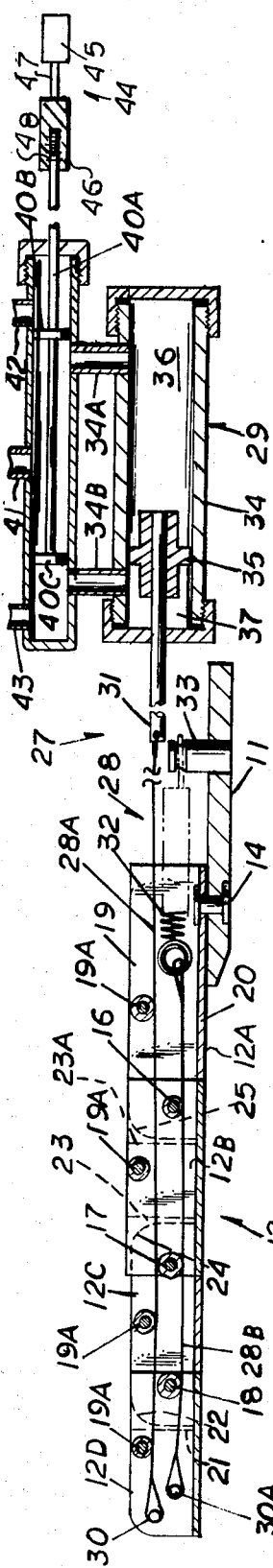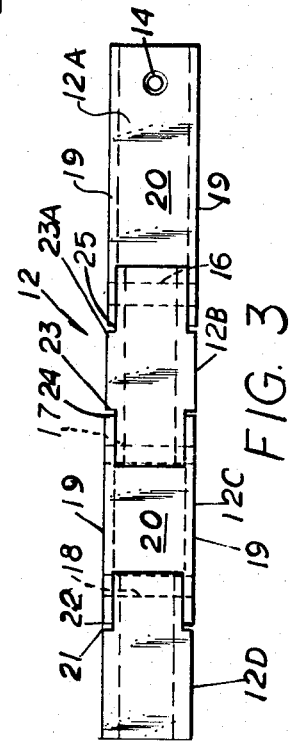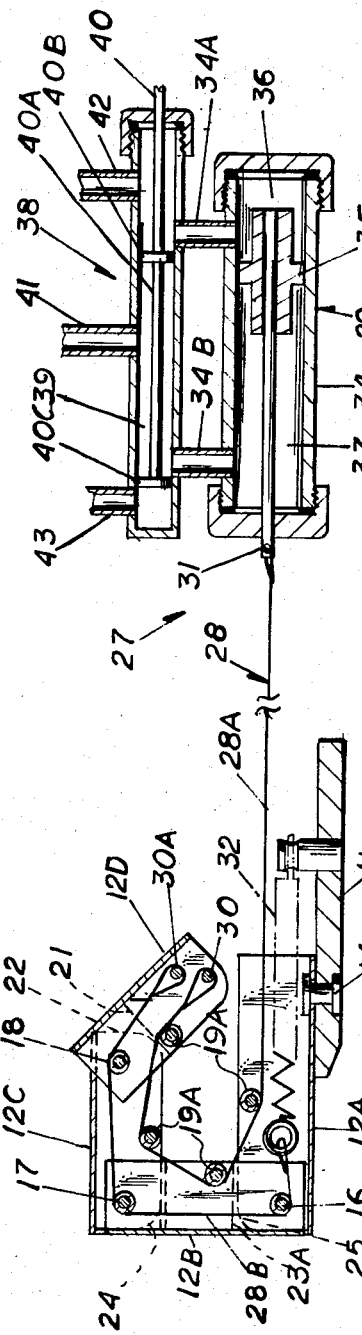

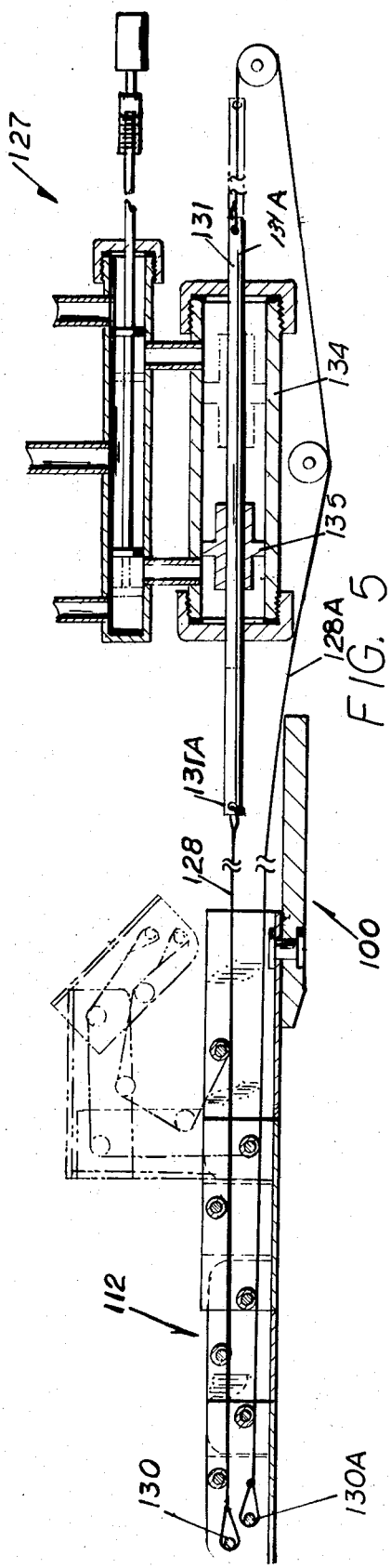

MECHANICAL HAND

PROBLEM AND PRIOR ART

Many efforts have been made to construct a mechanical hand. Generally the mechanical hands heretofore known were specifically designed for use by amputees. Consequently the amount of useful work which such artificial hands was capable of performing was seriously limited as such hands lacked the ability and/or the necessary activating power means to do any useful heavy work. Many of the known artificial hands were further incapable of producing independent finger movements necessary to duplicate the complex or compound movements of a human hand needed to perform useful work. U. S. Pat. Nos. 40,397; 1,247,077; 1,501,308; 2,285,885; 2,425,154 and 2,486,746 are evidence of several of the known patented artificial hand constructions in which the respective fingers and thumb digits were not independently movable.

Another noted deficiency of the known prior art mechanical hand constructions was the limited movement capable by the thumb digit relative to the respective finger digits. With the known constructions it was not heretofore possible to manipulate the thumb digit so that its tip end could be maneuvered to independently touch the tip end of each of the respective finger digits in a manner rendered possible by a human hand. For this reason the known mechanical hand constructions lacked the maneuverability and/or dexterity afforded by the human hand. U. S. Pat. No. 2,435,614 illustrates a typical artificial hand construction illustrating such limited thumb movement which the present invention contemplates obviating.

OBJECTS

An object of this invention is to provide a mechanical hand constructed so that when actuated it can simulate most of the movements of a human hand necessary to perform useful or heavy work.

Another object of this invention is to provide a mechanical hand capable of simulating the movements of a human hand in which the overall structure is maintained substantially proportional in size and shape to that of an adult human hand.

Another object of this invention is to provide a mechanical hand having finger and thumb digits formed of connected segments, jointed to include limits of flexiblity that prohibits the reverse flexing of the respective digits beyond that capable of a human hand without adversely limiting the forward motion or flexing of the respective digits, thereby permitting the hand to firmly grasp tools or articles with a positive and steady gripping force.

Another object of this invention is to provide a mechanical hand having a thumb digit means constructed and arranged so as to have substantially all of the same motions of a human thumb without resorting to a ball and socket construction which would be rendered unstable in the absence of a means simulating a human muscle.

Another object of this invention is to provide a mechanical hand with a thumb construction capable of being flexed about several axes of rotation.

Another object of this invention is to provide a mechanical hand in which each of the respective digits are actuated by tendons to flex the one or more digits independently and/or simultaneously between an operative and inoperative position so that each digit can be closed or opened independently of any other digit.

Another object of this invention is to provide a mechanical hand construction in which the tip ends of the respective finger digits can be pressed to the palm portion of the hand with considerable force.

Another object of this invention is to provide a mechanical hand having finger and thumb digits constructed and arranged so that they can be flexed in a manner which permits the tip end of the thumb to independently touch the tip end of each of the respective finger digits with considerable gripping force.

Another object is to provide a mechanical hand with jointed finger and thumb digits which are substantially square or rectangular in cross section with the pivot connections between adjacent points being disposed intermediate the width of the respective digits.

Another object of this invention is to provide a mechanical hand having tendon means for effecting the actuation thereof disposed on opposite side of the joint pivots.

Another object of this invention is to provide a mechanical hand having power activating means for effecting the independent actuation of the respective finger and thumb digits.

BRIEF SUMMARY OF THE INVENTION

The foregoing objects and other features and advantages of this invention are attained by a mechanical hand having a base plate simulating the palm portion of the hand. A plurality of finger digits and a thumb digit are articulated to the palm or base plate. The thumb digit is constructed and arranged so as to have two hinged joints external to the base plate and a joint within the base plate, the latter being provided with three axes of rotation arranged so that in certain positions two of the hinged joints are parallel to one another enabling the thumb digit to achieve the simulated movements of a human thumb without utilizing a ball and socket connection which would be rendered unstable without some means similar to that of a human muscle. Tendon means are operatively associated with the thumb digit for effecting its actuation about the respective axes of rotation and/or for effecting the flexing of the jointed connections between operative and inoperative positions. Independent actuating means are operatively connected to the respective thumb tendons for applying the necessary power for working the thumb digit.

The respective finger digit means are constructed of connected joints pivotally secured to provide a pair of parallel pivoted joints disposed outside of the palm of the hand, and a third pivoted joint parallel to the aforementioned two joints disposed within the palm portion of the hand. Each finger digit is articulated to the base plate by a fourth pivot disposed perpendicular to the finger joint pivots. The respective finger digits are each provided with a tendon means for flexing and retracting the finger digits, that is, moving of the finger digits between a flexed position toward the palm portion of the hand and an extended position outwardly of the palm portion. The tendon means are each operatively connected to power activating means for applying the necessary pull or force on the respective tendons so that each finger can be closed or opened independently and/or simultaneously with any other digit. The arrangement is such that one or more of the finger digits can be flexed so that the tip ends thereof press to the palm or base plate with a considerable force. Also, the digit movements are such that the thumb and finger digits can be flexed to enable the tip end of the thumb digit to touch the tip end of each of the respective finger digits with considerable gripping force. Preferably the finger digits and thumb digit are made with substantially square or rectangular sections with the pivoted connection between adjacent joints disposed substantially midway between the palm and back sides of the digits with the associated tendon means disposed on opposite sides of the pivoted connection.

The joints of the respective finger and thumb digits are constructed to include limiting means to prevent back flexing of the fingers in a retracted direction beyond that which is experienced in a human hand; without inhibiting the forward motion which enables the digits to grasp various tools and articles with considerable force.

FEATURES

A feature of this invention resides in the provision of a mechanical hand in which the respective finger digits are articulated to the palm portion or base plate in a manner to permit limited relative lateral movement therebetween.

Another feature of this invention resides in the provision of a mechanical hand in which each of the respective finger digits are constructed and arranged so as to be independently and/or simultaneously actuated for movement between a flexed or unflexed position.

Another feature of this invention resides in the provision of a mechanical hand having a thumb digit construction which enables the thumb to be actuated within the palm portion of the hand about a plurality of axes of rotation so as to simulate substantially the movements of a human thumb.

Another feature of this invention resides in the provision of a mechanical hand having finger and thumb digit constructions that enable the tip end of the thumb digit to independently touch the tip ends of the respective finger digits.

Another feature of this invention resides in the provision of tendon means being operatively connected to each of the respective finger and thumb digits to effect the independent actuation thereof.

Another feature of this invention resides in the provision of a plurality of activating means in the form of a fluid operated piston and cylinder assembly to affect the actuation of the respective digit means.

Other features and advantages will become more readily apparent when considered in view of the drawings and specification in which In the drawings:

FIG. 1 illustrates a perspective view of a mechanical hand embodying the present invention.

FIG. 2 illustrates a fragmentary detail sectional view taken longitudinally of a finger digit means having portions broken away and illustrating the power means for effecting actuation of the finger digit.

FIG. 3 illustrates a bottom plan view of the finger digit of FIG. 2.

FIG. 4 is a view similar to that of FIG. 2 but illustrating the finger digit in a flexed position.

FIG. 5 illustrates a sectional view of a modified form of the invention.

Referring to the drawings there is shown in FIG. 1 a mechanical hand assembly 10 embodying the present invention. The mechanical hand 10 comprises a palm or base plate 11 to simulate the palm portion of a human hand. Connected to the base plate 11 are a plurality of finger digit means 12 and a thumb digit means 13. Each finger and thumb digit is proportionally sized as in a human hand. Each of the respective digit means 12 and 13 is pivotally connected to a marginal portion of the base plate by means of a pivoted connecting pin 14 and 15 respectively, for limited lateral movement. The lateral movement provided is equal to the lateral finger movement afforded by a human hand. Stop pins 16 limit lateral movement of the finger digits 12.

Each of finger digit means 12 is substantially similar in construction and each is arranged so as to simulate the movement of a human finger. The respective finger digit means 12 each comprises a plurality of pivotally connected joints 12A, 12B, 12C and 12D. For example, each finger means 12 contains a metacarpal joint 12A which is pivotally connected at one end to the palm or plate member 11 about a pivot pin 14. A first phalanx or joint 12B is pivotally connected to the other end of the metacarpal joint 12A about a connecting pivot pin 16 disposed perpendicular to the pivot 14. The second phalanx joint 12C is connected to the outer end of the first phalanx joint 12B by a pivot pin 17, and a third or distal phalanx 12D is connected to the outer end of a second or middle phalanx 12C by a pivot pin connection 18.

In the illustrated embodiment, each finger joint 12A–12D is defined as a structural channel shaped member defined by a pair of opposed side flanges 19—19 interconnected by a web 20. As shown, each of the respective joints 12A–12D of the finger digit means 12 is illustrated as being open on the palm side. However, it will be understood that the joints 12A–12D of the respective finger means 12 may be closed on the palm side by another interconnecting web portion disposed parallel to the bottom web portion to define a rectangular cross section (not shown). Interconnected between the side flanges 19—19 of the respective finger joints is a guide pin 19A spaced above pivot pin connecting adjacent finger joints.

The adjacent connected joint segments 12A–12D of the respective finger digits are provided with complementary surfaces to limit the angular rotation or pivoted movement of one joint relative to the next adjacent joint about their respective pivots 16, 17 and 18. As best seen in FIGS. 1 to 3 the distal finger joint 12D and the middle finger joint 12C of each finger digit are provided with limiting complementary shoulders. For example the distal joint 12D has an external shoulder portion 21 formed on the opposed flanges 19—19. The adjacent end of the middle joint 12C is formed with complementary shoulder portions 22 to limit relative movement of the respective joints 12D, 12C about pivot 18 as the finger is flexed between operative and inoperative positions as illustrated in FIGS. 2 and 4 respectively. Similarly the first finger joint 12B is provided with limiting shoulders 23 to complement shoulders 24 and 25 of the adjacent metacarpal joint 12A and middle joint 12C to limit the respective rotation thereof about respective pivots 17 and 16.

As will be hereinafter described, each of the respective digit means 12 and 13 may be flexed independently and/or in unison to simulate the finger movements of a human hand between an operative clenching position FIG. 4 and an inoperative extended position FIG. 2. The arrangement of the finger joints, due to the limiting complementary shoulders described, is such that in the extended position as indicated in FIGS. 1 and 2 the fingers or finger joints cannot be flexed backwardly to an extent greater than that possible by a human hand.

Means are provided for effecting the flexing of the respective finger digit means 12 either independently of one another and/or in unison with one or more of the other finger digits 12. The finger flexing means 27 comprises a tendon means 28 and an associated power activating means 29 operatively connected to the tendon means to effect the necessary pull to flex the finger means accordingly. As shown, the tendon means 28 comprises a first or flexing tendon 28A formed as an elongated strip of flexible material, as for example, a plastic ribbon, leather or the like in which one end is suitably secured about a pin 30 extending between the side flanges 19—19 adjacent the tip end of the distal phalanx 12D and having its other end suitably connected to the piston rod 31 of the power activating means 29. As best seen in FIGS. 2 and 4 the flexing first tendon 28A extends above the respective pivot pins 16, 17 and 18 of the respective joints 12A-12D and below guide pins 19A intermediate the width of the side flanges 19—19. A second or retracting tendon 28B is connected at one end to another pin 30A extending between the side flanges 19—19 of the third finger joint 12D adjacent the tip end thereof. The other end of tendon 28B is suitably secured to the end of a tension spring 32 which is anchored to the base plate at its other end by an anchor pin 33.

The actuating means 29 to which the end of the flexing or first tendon 28A is connected comprises a piston and cylinder assembly. As best seen in FIGS. 2 and 4 the piston and cylinder assembly comprises a closed cylinder 34 in which there is slidably mounted a piston 35 separating the cylinder into two expandible chambers 36 and 37. A piston rod 31 connected to the piston 35 extends beyond the end of the cylinder 34. The extended end of the piston rod 31 is provided with a suitable means for effecting the securing of the tendon 28A thereto.

The cylinder 34 is provided with a pair of inlet-outlet means 34A, 34B in communication with chambers 36, 37 disposed on opposite sides of the piston head 35. Suitably connected to the inlet-outlets 34A, 34B of the cylinder 35 is a valve means 38 comprising an elongated valve chamber 39 in which a spool valve 40 is slidably disposed for sequentially valving the inlet-outlet ports 34A, 34B. Communicating with the valving chamber 39 is an inlet or conduit 41 by which an activating fluid is introduced into the valving chamber 39. It will be understood that conduit 41 connects to a fluid reservoir not shown, e.g. a hydromatic liquor reservoir or a compressed air source.

The spool valve includes a valve stem 40A for valving ports 34A or 34B having connected thereto spaced valve head 40B, 40C. Also a pair of exhaust port means 42 and 43 are connected in communication with the ends of valve chamber 39. The exhaust port means 42, 43 permit the venting of the fluid pressure exhausting from the respective chambers 36 and 37 of the cylinder 34 during the actuation thereof. The arrangement of the valve 40 is such that it will sequentially valve ports 34, 34A to effect fluid displacement of piston 35.

Means 44 for controlling the actuation of the valve 40 are provided. In the illustrated form of the invention the means 44 for effecting the actuation of the valve means to control fluid pressure to cylinder 34 comprises a reversible electric motor 45 having a driving gear 46 connected to the motor spindle or armature 47. The motor drive gear 46 in turn is disposed in meshing relationship with a worm 48 connected on the extended end of the valve stem 40A. Upon energizing the motor 45 the rotation imparted to the drive gear 46 in one direction or the other, disposed in meshing relationship with the worm connected, is transformed into a linear motion of the valve stem 40A to effect displacement of the valve heads within the valve body accordingly. In so doing the ports 34A and 34B are valved so that fluid pressure is alternately directed and exhausted from the respective cylinder chambers 36 and 37. Therefore depending upon the direction of rotation of the motor means the associated valve stem is reciprocated to and fro accordingly.

The tendon means 28 of the respective finger digits 12 are each operatively connected to its own power activating means 29 so that each finger digit 12 can be independently activated.

In operation the tension spring 32 acting on tendon 28B will normally maintain the associated finger digit 12 in its inoperative extended position as view in FIG. 2. To effect the flexing of any finger digit 12 toward its operative position as viewed in FIG. 4 the actuating motor 45 is energized to effect a displacement of the associated valve means 38 to a position indicated in FIG. 4 to permit fluid pressure to be directed through port 34B to chamber 37. In this position valve head 40B is disposed to open chamber 36 in communication with vent 42. Thus as fluid pressure is entering chamber 37 to effect displacement of piston 35 to the right as viewed in FIG. 4, the fluid pressure in chamber 36 is being vented to vent 42. The displacement of piston 35 and its rod 31 thus exerts a pull on tendon 28A causing the associated finger digit 12 to flex as seen in FIG. 4. The finger remains flexed as long as pressure is applied to chamber 37 of cylinder 34. In the flexed position of FIG. 4, it will be noted that tendon 28B causes spring 32 to be distended. The operation of the finger digits is such that when a pull is applied to tendon 28A, the respective finger joints are serially activated starting with the distal joint 12D.

To return the finger digit 12 to its unflexed position as shown in FIG. 1 the motor 45 is reversed causing the valve heads to open port 34A to fluid pressure and port 34B to exhaust 43. In this position fluid pressure is applied to chamber 36 causing the piston 35 to be moved to the left as in FIG. 2. The spring 32 acting on tendon 28B returns the associated finger digit to its extended position. Accordingly, the arrangement is such that the co-action between the piston and cylinder assembly 29 and the spring 32 maintains the associated tendons 28A, 28B under tension and taut at all times.

From the description thus made it will be apparent that each of the respective finger digits 12 can be individually actuated between an inoperative extended position as indicated in FIG. 2 and a fully flexed operative position as illustrated in FIG. 4. By simultaneously energizing the power means 27 of the respective fingers, they can be simultaneously flexed.

The thumb digit means 13 comprises a metacarpal joint 13A to which there is connected a first phalanx or joint 13B and a second phalanx or joint 13C. As shown the thumb joints 13A, B and C, like the finger joints, are formed of a channel or rectangularly shaped member. The thumb digit means 13 is pivotally supported on the base member for rotary movement about three independent axes of rotation. This is attained by supporting the thumb digit means 13 on a mounting block 50 which is pivotally connected to the base plate 11 by means of pivot 15. The mounting block 50, as best seen in FIG. 1, is mounted for movement about an axis perpendicular to base plate 11. In the illustrated form of the invention the mounting block 50 comprises a U-shaped member having one side 50A resting on plate 11 to receive the pivot pin 15. Connected to the other side 50B of the mounting block 50 is a flange 52 to define a bearing rotatably supporting a thumb mount 53 for rotation about an X axis. As shown, the thumb mount 53 comprises a channel shaped member having opposed flange portions 53A, 53A and an interconnecting web portion 53B. The web 53B is connected to a pin or shaft 54 which is rotatably journalled in a suitable opening formed in flange 52. A coil spring 55 having one end fixed into the shaft 54 and having its other end anchored to the flange 52 is provided for normally biasing the thumb mount to extend the connected thumb digit 13 to outwardly extended position as seen in FIG. 1. The mounting block 50 is also normally biased by a spring member 56 to a position as shown in FIG. 1. One end of spring 56 is anchored to pin 57 on base plate 11 and the other end of the spring 56 is connected to a corner portion of the block 50. A suitable stop pin 58 is provided for limiting the rotational movement about pivot 15 in the direction of the bias of spring 56.

The metacarpal joint 13A of the thumb digit means 13 is pivotally connected between the flanges 53A of the thumb mounting block 53 by means of a pivot pin 60. Accordingly it will be noted that the metacarpal joint 13A of the thumb digit means can be rotated about the X axis of rotation of shaft 54 and at the same time pivot relative thereto about pin 60. A spring 61 normally biases the metacarpal joint 13A extended outwardly from the palm of the hand.

The thumb digit means 13 comprises the metacarpal joint 13A having one end thereof pivoted to the thumb mounting block 53 by pin 60. The other end of the metacarpal joint 13A is adapted to be pivotally connected to the inner end of the first phalanx 13B by pin 62. The distal or second phalanx 13B of the thumb digit means 13 is connected to the other end of the first phalanx 12B of the thumb means by pin 63. Similar to the finger digits, the metacarpal joint 13A of the thumb is provided with shoulder portions 64 and 64A which cooperate with the adjacent complementary surface 53B of the mounting block 53 and complementary shoulder 65 of adjacent first phalanx joint 13B to limit the rotation thereof with respect thereto. Likewise the thumb distal phalanx 13C is provided with a shoulder portion 66 complementing the edge portion 67 of the adjacent end of the first phalanx 13B to limit relative movement between the distal phalanx 13C and the first phalanx 13B.

As described with respect to the respective finger digit means 12, a tendon means 70 is provided for effecting the flexing of the thumb digit means 13. The thumb digit flexing means comprises a first tendon portion 70A having one end thereof secured to a pin 71 on the distal joint 13C and the other end to the piston of a power activating assembly similar to assembly 27 described. The other tendon portion 70B is extended between pin 72 in the distal joint, 13C and a tension spring 73. As in the finger digit spring 73 functions similar to spring 32. Thus tendon 70A functions as the flexing tendon and tendon 70B as the restoring tendon of the thumb digit means. In operation, the thumb digit means 13 can be rotated about axis of the mounting block pivot 15, the axis of shaft 54 and the axis of pivot 60.

Rotation of the thumb digit 13 and its mounting block 50 about pivot 15 is attained by a tendon 75 connected to an extended arm 76 carried by flange 52. One end of tendon 75 is secured to arm 76 and the other end secured to the piston rod of a power assembly 27 as hereinbefore described. Thus when the power unit 27 controlling the pull on tendon 75 is actuated as herein described, the force applied will effect rotation of the mounting block and thumb digit carried thereon in a counterclockwise rotation about the axis of pivot 15. Upon release of the force acting on tendon 75, the spring 56 will return or bias the mounting block to is normal position as shown in FIG. 1.

Rotation of the thumb digit 13 and its thumb mount 53 about the axis of shaft 54 is effected by another tendon 78 which has one end coiled about a pulley 54A carried on shaft 54. The other end of tendon is operatively connected to a power means 27 similar to that described. Thus when a force or pull is applied to tendon 78, it will tend to unwind about pulley 54A causing rotation thereof in a clockwise direction as viewed in FIG. 1. The restoration of the thumb digit 13 and its mounting block 53 when the force on tendon 78 is released is effected by the energy stored in coil spring 55.

Rotation of the thumb digit 13 about pivot 60 is attained by tendons 70A, 70B and their associated power means. It will thus be noted that the thumb tendon means 70, 75 and 78 are operatively connected to separate and independent actuation means similar to power units 27, hereinbefore described, to effect rotation of the thumb about the three axes of rotation thereof described.

It will therefore be apparent that for each hand construction having four finger digits 12 and a thumb digit 13 as herein described, that seven separate and distinct actuating means 27 of the type hereinbefore described are required.

The motor means 45 of the respective actuating means 27 may be wired to a control panel whereby an operator may effect either individual or simultaneous actuation of the respective motor means. In this manner complete control may be attained over the movement of the finger digit 12 and/or thumb digit 13 to carry out a prescribed operation from a remote control point.

An operator by activating the proper actuating means 27 may flex one or all of the respective finger means to perform a prescribed type of work. Also the arrangement is such that the fluid pressure energizing the actuating means 27 may be maintained or controlled to exert a considerable holding force on the respective finger and thumb digit means enabling the hand 10 to hold or grasp a working tool or article with considerable force. In the construction described each digit means is normally biased to its extended inoperative position by means of a restoring spring, e.g. springs 32, 56, 55, 61 and 73.

FIG. 5 illustrates a modified form of the invention wherein the restoring of the respective digit means may be attained by the activating means which applies the pull on the respective tendon. In this form of the invention the mechanical hand 100 is similar in all respects to the mechanical hand 10 hereinbefore described with the exception that the restoring spring 32 of the finger digits herein described have been eliminated. In this form of the invention the actuation means 127 is arranged to supply the function of restoring springs 32 to the finger digits. The power unit 127 is similar in construction to that hereinbefore described except that the piston rod 131 is constructed to extend beyond both of the cylinders 134. In this embodiment flexing tendon 128 is operatively connected between pin 130 to one end 131A of the piston rod 131. The restoring tendon 128A is connected between pin 130A to the other end 131B of the piston rod 131. Thus depending upon the direction of movement of the piston 135 within the cylinder 134 the connected digit 112 is pushed or pulled between a flexed operative position as shown in phantom on FIG. 5 and an extended inoperative position as shown in the solid line showing.

In all other respects the operation of the mechanical construction of FIG. 5 is similar to that hereinbefore described.

From the foregoing it is apparent that the mechanical hand construction described can be particularly applicable to robot type applications and/or manipulations in situations where it is desirable to effect by remote control work operations similar to those which can be performed by a human hand, in environmental conditions not suitable or accessible by humans.

While the instant invention has been described with respect to particular embodiments it will be readily appreciated and understood that variations and modifications may be made without departing from the spirit or scope of the invention.

What is claimed is:

1. A mechanical hand simulating the human hand comprising
    a base plate forming the palm portion of a hand,
    a plurality of finger digit means articulated for relative lateral movement to said base plate,
    a thumb digit means articulated to said base plate for movement about three axes of rotation,
    each of said digit means including a plurality of articulated joints,
    fixed pivot means hingedly connecting the adjacent joints of the respective digit means,
    tendon means operatively connected to each of said digit means, and
    actuating means connected to each of said tendon means for effecting the independent actuation of the respective digit means.

2. A mechanical hand as defined in claim 1 and including means for limiting the back flexing of each of said digit joints.

3. A mechanical hand as defined in claim 1 and including a plurality of thumb tendon means operatively connected to said thumb digit means for effecting the movement of said thumb digit means about its respective axes of rotation when the respective thumb tendons are actuated.

4. A mechanical hand as defined in claim 1 wherein said actuating means includes
    a piston and cylinder assembly,
    a source of fluid power for effecting the actuation of said assembly,
    a valve means for controlling the flow of said fluid power to said assembly, and means operatively connected to said valve means for effecting the actuation thereof.

5. A mechanical hand as defined in claim 1 wherein each finger digit means includes four segments connected in tandem, and pivot means pivotally connecting the adjacent ends of adjacent segments to define an articulated joint thereat.

6. A mechanical hand as defined in claim 5 wherein each segment is defined as a channel shaped member, each member having opposite side flanges interconnected by a web portion.

7. A mechanical hand as defined in claim 5 wherein said pivot means includes a pivot pin interconnected between said side flanges intermediate the width of said flanges.

8. A mechanical hand as defined in claim 7 and including a guide pin interconnected between the flanges of each channel member, said guide pins being spaced from the pivot pins.

9. A mechanical hand as defined in claim 1 wherein said tendon means includes a digit flexing tendon and a digit restoring tendon, said restoring tendon biasing its respective digit to an inoperative unflexed position.

10. A mechanical hand as defined in claim 9 including means connecting one end of said flexing tendon to the tip end of said digit means and the other end to said actuating means.

11. A mechanical hand as defined in claim 10 and including a spring means operatively associated with each finger digit, and said restoring tendon having one end connected to the tip of its respective digit means and having the other end connected to said spring means; said spring means normally biasing the respective digit means toward the inoperative unflexed position.

12. The mechanical hand as defined in claim 10 and including means connecting one end of each of said flexing tendon and restoring tendon to the tip end of an associated digit, and having the other end of said tendons respectively connected to opposite ends of said actuating means.

13. The mechanical hand as defined in claim 1 including a first pivot means for pivotally connecting said thumb digit means to said base plate for rotation about a first axis of rotation, a second pivot means for rotably journalling said thumb digit means about a second axis of rotation, and a third pivot means for articulating the thumb digit means about a third axis of rotation.

14. A mechanical hand simulating the human hand comprising a base plate forming the palm portion of a hand, a plurality of finger digit means articulated to said base plate, a thumb digit means articulated to said base plate for movement about a plurality of axes of rotation, each of said digit means including a plurality of articulated joints, tendon means operatively connected to each of said digit means, and actuating means connected to each of said tendon means for effecting the independent actuation of the respective digit means, said thumb digit means including a metacarpal joint, and connected first and second phalanx joints, and including means for pivotally connecting the metacarpal joint of said thumb digit means for rotation about three axes of rotation relative to said base means.

15. A mechanical hand as defined in claim 14 wherein said tendon means includes a tendon means for effecting the actuation of each of said finger digit means, and three tendon means operatively connected to said thumb digit means for effecting independent actuation of said thumb digit means about its respective axes of rotation.

16. A mechanical hand as defined in claim 15 and including stop means for limiting the rotation of the thumb digit means about its respective axes of rotation.

17. A mechanical hand as defined in claim 14 wherein the adjacent joints of the respective digit means have complementary means to limit the relative rotation of the respective joints about their respective pivoted connections.

18. A mechanical hand as defined in claim 14 wherein the joints of said digit means include a channel shaped member having opposed side flanges and an interconnecting web portion.

19. A mechanical hand as defined in claim 18 and including a guide pin interconnected between the side flanges of each joint.

20. A mechanical hand as defined in claim 19 wherein the tendon means of the respective digit means extend longitudinally of the respective digit means between the pivoted connections and said guide pins.

21. A mechanical hand as defined in claim 14 wherein said actuating means comprises a cylinder, a double acting piston disposed within said cylinder, a piston rod connected to said piston means for introducing fluid pressure into said cylinder, and valve means for controlling the direction of fluid flow through said cylinder for effecting displacement of said piston therein, and a valve actuator for controlling the operation of said valve means.

22. A mechanical hand as defined in claim 21 wherein said valve actuator comprises a motor means, and means operatively connecting said valve means to said motor means for transforming the rotary motion of said motor means to a corresponding linear displacement of said valve means.

* * * * *